3,527,656
ANCHOR COATED REGENERATED
CELLULOSE FILM
John Milton Lorenz, Clinton, Iowa, assignor to E. I. du Pont de Nemours and Company, Wilmington, Del., a corporation of Delaware
No Drawing. Filed June 26, 1967, Ser. No. 648,989
Int. Cl. B44d *1/16;* B32b *23/08*
U.S. Cl. 117—76                                                4 Claims

ABSTRACT OF THE DISCLOSURE

An anchor coating composition for cellophane is provided composed of a formaldehyde-containing resin and between about 25% and about 150% by weight, based upon the weight of said resin, of urea. Film structures bearing the above-mentioned anchor coating composition and the method of making said film structures are also provided.

---

The present invention relates to the manufacture of cellophane film structures and, more particularly, is directed to improvements in and relating to anchoring compositions for cellophane film structures and to a method of making such cellophane film structures.

The present invention is generally applicable to the production of cellophane film structures derived from any film forming cellulosic material as are obtainable by means of the well-known cupro-ammonium process or the xanthate process. Because of the commercial importance of cellulose film structures obtained by the xanthate process, such cellulose material constitutes the preferred cellulose material utilized in the present invention, and the invention will be described hereinafter with specific reference to regenerated cellulose film structures derived from the xanthate process.

Regenerated cellulose film structures are generally prepared by extruding an alkaline solution of cellulose xanthate (viscose) through a long, thin casting die or hopper into a sulfuric acid-sodium sulfate coagulation-regeneration bath, which first coagulates the cellulose xanthate as a coherent sheet of film, then decomposes the xanthate to produce a highly swollen, moisture-laden gel-film structure of regenerated cellulose. The freshly formed gel-film structure is subsequently passed through a series of liquid treating baths to wash, desulfurize, bleach and plasticize the film structure to remove impurities, improve its brightness, flexibility and strength. The foregoing process is described in greater detail in, for example, U.S. Pat. No. 1,548,864. The purified and plasticized film structure is then dried while passing over a series of heated drums. The regenerated cellulose film structures above described are hydrophilic in nature; that is, they are both water-sensitive and permeable to water vapor. It is, therefore, customary to provide such film structures with a moisture-proof coating composition such as the nitrocellulose compositions described in U.S. Pat. No. 2,533,557 or vinylidene chloride copolymers as described in U.S. Pat. No. 2,711,996. Such moisture-proof coating compositions do not adhere well to regenerated cellulose film structures and it is therefore necessary to utilize an anchor coating agent on the surface of the regenerated cellulose film structure to promote and improve the adhesion of the moisture-proof coating composition thereto. For instance, the use of formaldehyde resins as anchor agents in regenerated cellulose film structures for adhering thereto subsequently applied coatings is described in U.S. Pat. Nos. 2,546,575; 2,796,362; 2,533,557; 2,394,009 and 2,575,443. A major drawback and shortcoming involved in the use of such resins is that the resulting coated regenerated cellulose film structure is characterized by an objectionably high content of free or potentially free formaldehyde. Furthermore, if the amount of anchor agent used is reduced to the point where the amount of free formaldehyde remaining in the regenerated cellulose film structure is not objectionable, then inadequate adhesion of the top coatings to the base film of regenerated cellulose results. Accordingly, it is the principal object of the present invention to provide an improved composition useful for coating base film structures of regenerated cellulose.

According to the present invention there is provided a composition comprising a formaldehyde resin and between about 25% and about 150% by weight, based upon the weight of said resin, of urea. The composition of the invention preferably comprises a melamine-formaldehyde resin and between about 50% and about 125% by weight, based upon the weight of said resin, of urea.

According to the present invention there is further provided a film structure comprising a base film of regenerated cellulose having an adhesion promoting composition on at least one surface thereof of a formaldehyde resin and between about 25% and about 150% by weight, based upon the weight of said resin, of urea.

According to the present invention there is further provided a method of manufacture for improving the adhesion of coatings to gel-regenerated cellulose film structures which comprises applying to at least one surface of said gel-regenerated cellulose film structure before drying an anchor composition of a formaldehyde resin and between about 25% and about 150% by weight, based upon the weight of said resin, of urea, and thereafter drying said coated regenerated cellulose film structure.

The nature and advantages of the present invention will be more clearly understood from the following description thereof.

The composition of the present invention is comprised of a plurality of components. One essential component thereof is a formaldehyde resin. For instance, the formaldehyde resin may be, for example, urea-formaldehyde or melamine-formaldehyde resins. Typical resins of the urea-formaldehyde type are described in U.S. Pat. No. 2,533,557. Typical melamine-formaldehyde resins include those described in U.S. Pat. Nos. 2,546,575 and 2,796,362. The amount of the formaldehyde resin employed in the composition of the invention may be between about 0.01 and about 1% by weight, based upon the weight of the regenerated cellulose film structure to which it is applied. The other essential component of the composition of the present invention is urea. The amount of urea employed may be between about 25% and about 150% by weight, based upon the weight of the above-described formaldehyde resin.

In practicing the method of the present invention, the anchor coating composition of formaldehyde resin and urea above described is incorporated into the gel-regenerated cellulose film structure usually or optionally with a softening agent after the gel-regenerated cellulose film has been formed, purified and washed and just prior to the drying thereof. The anchor coating composition is incorporated into the base film structure of gel-regenerated cellulose by any convenient technique as, for example, by coating obtained by passing the gel-regenerated cellulose film structure into a tank containing the anchor coating composition. Such techniques are well-known in the art of producing cellophane film structures. The gel-regenerated cellulose film is dried after having been treated with the anchoring composition of formaldehyde resin and urea by passing it over heated rolls in the dryer device of a conventional cellophane manufacturing machine. Thereafter, the dried film may be top-coated with any appropriate coating composition. These may include, for example, coating compositions based on plasticized nitrocellulose compositions, copolymers of vinylidene chloride or copolymers of polyvinyl chloride, etc. Alternatively, polymers and copolymers of ethylene may be extrusion coated onto the treated base film.

The principle and practice of the present invention will now be illustrated by the following examples which are provided to show the practice and use thereof, but it is not intended that the invention be limited thereto since modifications in technique and operation will be apparent to anyone skilled in the art. All parts and percentages in the following examples are by weight unless otherwise indicated.

The test samples of coated gel-regenerated cellulose film prepared in the following examples were evaluated in accordance with the following testing procedures:

*Cold peel strength* is measured by attempting to lift the coating from the base film of a test sample with a sharp edged instrument such as a knife. If the coating cannot be lifted without rupture of the coating itself, the bond is labelled "No peel" (P). If the coating can be lifted, a one inch wide strip of adhesive tape is attached to the loosened strip which is then pulled off at an angle of 180°. The bond so obtained can be labelled "can peel" or the actual force required to peel the strip of coating can be recorded. Prior to testing the coated film test samples are conditioned for 24 hours at 81% relative humidity (RH).

Anchorage refers to the adhesion of the coating to the base film when in direct contact with water. Samples of the coated base film are suspended in water at 45° C. for 16 hours and then examined and graded as follows:

Grade 1—No blisters
Grade 2—Few blisters
Grade 3—Decided blistering
Grade 4—Coating sloughs-off at blistered or unblistered portions

EXAMPLE 1

An anchor resin was made by reacting 252 parts of melamine (2 moles), 1620 parts of 37 percent formalin (20 moles) and 2 parts of 20% sodium hydroxide solution in a reaction vessel fitted with a stirrer. This mixture was heated at 75° C. for 30 minutes and then cooled to 65° C. after which 120 parts of 3,3'-iminobispropylamine (0.92 mole) and 90 parts of 37.5 percent hydrochloric acid were added. An exothermic reaction took place and the mixture was held at 70° C. by cooling for about 20 minutes. When the viscosity reached 1 by the Gardner-Holdt method, 50 parts of sodium hydroxide are added followed by 1296 parts of 37% formalin. The resulting solution was water clear and had a solids content of about 27%.

A sheet of regenerated cellulose film containing 18% by weight of glycerol and an anchoring composition of the above-formulated resin with urea in the amounts specified in the table below was coated with the nitrocellulose composition described in Example II of U.S. Pat. No. 2,533,557 to which was added 2% by weight, based upon the total weight of the nitrocellulose composition, of maleic acid. The results are shown in tabular form below.

| Test Sample | Anchor coating composition | | Anchor- age grade | Cold peel strength | Free formaldehyde remaining in film, p.p.m. |
|---|---|---|---|---|---|
| | Melamine- formaldehyde resin, percent | Urea, percent | | | |
| 1 | 0.5 | 0.0 | 1 | NP | 636 |
| 2 | 0.5 | 0.5 | 1 | NP | 309 |
| 3 | 0.5 | 1.0 | 4 | 40 grams | |

The results illustrate that anchorage performance degrades as the amount of urea in the film exceeds about 0.5%, based upon the weight of the regenerated cellulose film.

EXAMPLE 2

The procedure described in Example 1 was followed for coating a base sheet of regenerated cellulose with a toluene/tetrahydrofuran solution (50/50 by volume) of a vinylidene chloride/acrylonitrile/methyl methacrylate/ itaconic acid (91.5/6/2/0.5) copolymer prepared in the manner described in Example 5 of Argentine Pat. No. 149,568. The test film samples containing an anchor coating composition of 0.5% of melamine-formaldehyde resin and 0.5% of urea exhibited 133 p.p.m. of free formaldehyde after coating with the above-described vinylidene chloride top-coat, whereas a control test film sample containing no urea in the anchor coating showed 503 p.p.m. of free formaldehyde.

The amount of anchor coating composition containing urea and formaldehyde resin employed according to the present invention depends to a degree upon the adherability performance required and the free formaldehyde level that can be tolerated in the finally coated film structures. In sustained operation using an anchor coating of about 0.20% of both melamine-formaldehyde resin and urea a heat-seal level of 267 grams per inch was realized, essentially the same as the value in the absence of urea additive. Free formaldehyde level in the film was 286 p.p.m., about only one-half of the amount otherwise present when no urea was used in the anchor coating composition. Thus, using urea in the anchor coating composition within the limits prescribed according to the present invention does not impair heat-seal strength. Also, the effect of the urea additive on the degree of resin cure is illustrated by the observation that a test film sample of regenerated cellulose containing 0.20% by weight of a melamine-formaldehyde resin and a comparable amount of urea on water extraction loses 3.1% of the melamine-formaldehyde resin. A similar film containing 0.18% of the resin but with no urea added shows removal of 21.8% of the resin on water extraction.

What is claimed is:

1. A film structure comprising a base of regenerated cellulose having an adhesion promoting composition on at least one surface thereof of a formaldehyde resin and between about 25% and about 150% by weight, based upon the weight of said formaldehyde resin, of urea.

2. The film structure of claim 1 wherein said formaldehyde resin is a melamine-formaldehyde resin.

3. A film structure comprising a base of regenerated cellulose having an anchor coating of an adhesion promoting composition on at least one surface thereof of a formaldehyde resin and between about 25% and about 150% by weight, based upon the weight of said formaldehyde resin, of urea, and a top coating uniformly adhered to said anchor coating of a vinylidene chloride copolymer.

4. The film structure of claim 3 wherein said formaldehyde resin is a melamine-formaldehyde resin.

References Cited

UNITED STATES PATENTS

| | | |
|---|---|---|
| 2,575,443 | 11/1951 | Cornwell. |
| 2,699,405 | 1/1955 | Rosser. |
| 2,796,362 | 1/1957 | Wooding et al. |
| 2,856,314 | 10/1958 | Wooding et al. |
| 2,977,246 | 3/1961 | Fisher et al. |
| 3,044,897 | 7/1962 | Celentano et al. |
| 3,380,877 | 4/1968 | Smucker et al. |
| 3,423,350 | 1/1969 | Ryan. |

WILLIAM D. MARTIN, Primary Examiner

R. HUSACK, Assistant Examiner

U.S. Cl. X.R.

117—122, 145, 161; 260—67.6

UNITED STATES PATENT OFFICE
CERTIFICATE OF CORRECTION

Patent No. 3,527,656          Dated September 8, 1970

Inventor(s)     John Milton Lorenz

It is certified that error appears in the above-identified patent and that said Letters Patent are hereby corrected as shown below:

Column 3, line 19, "(P)" should read -- (NP) -- ;
Column 3, line 62, after "composition" insert -- (based on weight of regenerated cellulose film) -- .

Signed and sealed this 27th day of April 1971.

(SEAL)
Attest:

EDWARD M. FLETCHER, JR.
Attesting Officer

WILLIAM E. SCHUYLER, JR.
Commissioner of Patents